Dec. 16, 1952  B. AMES  2,621,707
WALKABOUT
Filed June 24, 1944  6 Sheets-Sheet 1

Inventor
Butler Ames
by Roberts Cushman Crowell
Attys.

Dec. 16, 1952         B. AMES         2,621,707

WALKABOUT

Filed June 24, 1944         6 Sheets-Sheet 4

Inventor
Butler Ames
by Roberts Cushman
Att'ys.

Dec. 16, 1952   B. AMES   2,621,707
WALKABOUT
Filed June 24, 1944   6 Sheets-Sheet 5

Inventor
Butler Ames

Dec. 16, 1952          B. AMES          2,621,707

WALKABOUT

Filed June 24, 1944          6 Sheets-Sheet 6

Inventor
Butler Ames
by Roberts Cushman & Grover
Att'ys.

Patented Dec. 16, 1952

2,621,707

UNITED STATES PATENT OFFICE 2,621,707

WALKABOUT

Butler Ames, Boston, Mass.

Application June 24, 1944, Serial No. 541,908

8 Claims. (Cl. 155—22)

This invention pertains to portable supports for individuals unable to walk or to bear their full weight on their legs, for instance persons who have lost the use of one or both legs, convalescents or aged people, and relates more especially to an improved support of the kind disclosed in the United States patent to Ames, No. 2,282,689, dated May 19, 1942, and preferably embodying certain of the novel features more fully disclosed and claimed in the application of Butler Ames, Serial No. 520,745, filed February 2, 1944, which became Patent No. 2,437,778 on March 16, 1948.

A support of the kind to which the present invention relates comprises two substantially rigid supporting units normally disposed in spaced substantially parallel relation and between which the user stands or sits, and a back to which both units are hinged so that the entire device may readily be folded into compact form for transportation. The frames of the supporting units and back are in general similar to the corresponding parts of the patented device, preferably being made of stiff and light but rigid tubing. The top or hand-supporting bar or rail of each supporting unit is preferably integrally continuous with the front and rear legs of the respective units, while the lower stretcher bar of each supporting unit is welded to the legs, the constituent bars of the back likewise being welded together. The hinge connections between the supporting units and the back are likewise in general similar in structure and function to the corresponding portions of the patented device, being so designed as to permit the supporting units to be swung through arcs of approximately 180° and placed in parallel relation to the back so as to form a very compact structure easily carried and requiring but little space for storage.

While in the patented device the support is provided with skids at its rear end and with wheels at the front, the present invention contemplates the provision of wheels at both front and rear, the wheels at the rear being swiveled to facilitate steering the device. Moreover, as in the device of the above-named copending application, brake means is provided whereby the user may more readily and certainly control the movement of the support, each of the four wheels preferably being provided with a brake, and the brakes for the wheels of each unit, respectively, being independently controlled by a conveniently located hand-actuated element.

Moreover, as in the device of the aforesaid application, the present invention contemplates the provision of crutch-supporting staffs conveniently adjustable and carried by the supporting units so that the user may rest his weight upon the crutches and easily and rapidly propel the support, for example, by contact of one foot with the ground.

Among the objects of the present invention are to provide a portable support of the type above referred to, which will be of more general utility than that described in the aforesaid patent or pending application; to provide a portable support which may readily be propelled by a person totally unable to walk, for example one who has lost the use of both legs; to provide a support having provision for shielding the occupant from sun, wind and insects; to provide a support having provision whereby the crutch staffs are useful for supporting a canopy above the head of the user; to provide a support in which the user may be seated while it is being propelled and having convenient, strong and adequate foot rests for supporting the feet above the ground, but in which the foot rests may readily be folded out of the way to avoid interference with the user's feet when walking; to provide a support wherein the canopy and insect guard may readily be folded into very compact form when not in use; to provide a support having a seat which may be used in various positions according to the wishes of the user; to provide a support having releasable brace means so designed that when desired it rigidly unites the forward ends of the supporting units, thereby to stiffen the structure; and to provide a support so designed that it may be wheeled into the stall of the usual public or institutional toilet.

Other and further objects and advantages of the invention will be pointed out in the following more detailed description and by reference to the accompanying drawings, wherein.

The present invention is basically similar to that disclosed and claimed in the patent to Ames, No. 2,282,689, dated May 12, 1942, but represents an improvement over the device disclosed in said patent. It also comprises improvements over the device disclosed in the copending application of Ames, Serial No. 520,745, filed February 2, 1944, which became Patent No. 2,437,778 on March 16, 1948. In common with the device of said patent and application, the portable support of the present invention is of foldable type so that it may be compactly arranged for ease in transportation and storage but when in use is rigid and affords adequate support for the occupant.

Figure 5:
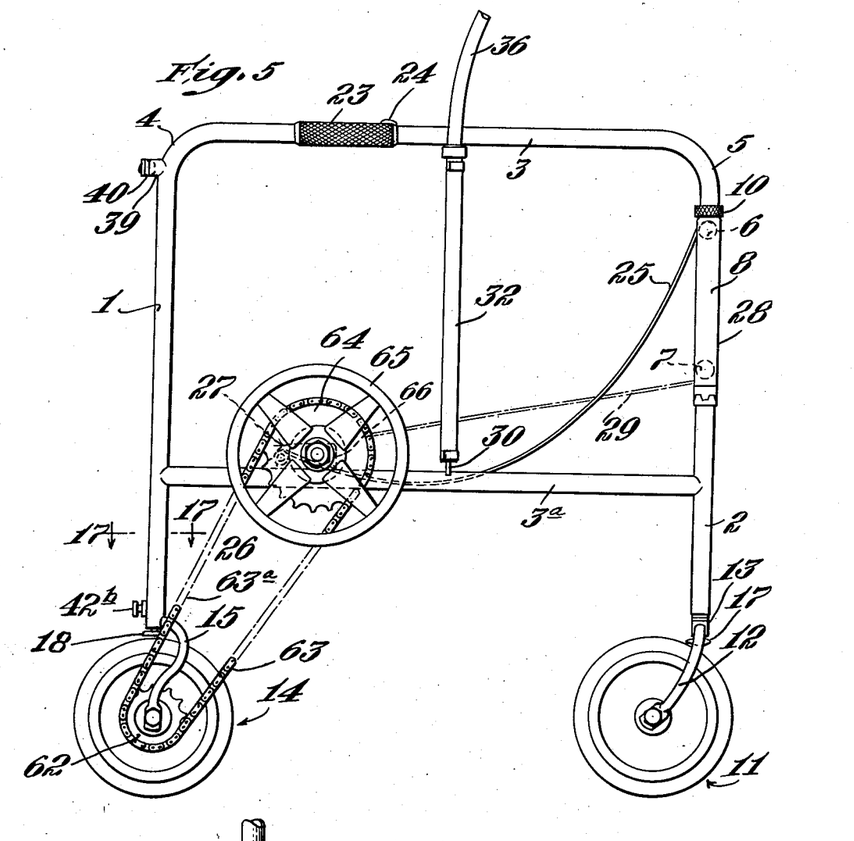
Fig. 5 is a fragmentary side elevation, to larger scale, showing the improved device, including means for propelling it by hand, and showing the canopy supports (broken off) in operative position.

As herein illustrated, the support comprises two substantially like supporting units which, when the device is in use, are disposed in substantially parallel vertical planes and which are united by a rigid back member. Each of these supports comprises front and rear legs 1 and 2 (Fig. 5) preferably made of stiff, rigid but thin metal tubing; a top or hand-supporting bar 3 preferably approximately horizontal and which is united by smooth bends 4 and 5 with the upper ends of the legs 1 and 2; each side unit also comprising a rigid stretcher bar 3ª spaced below the hand-supporting rail 3 and parallel to the latter and which is rigidly united, for example, by welding at its opposite ends, to the legs 1 and 2. The back (Fig. 6) also comprises vertically spaced upper and lower, substantially horizontal bars or rails 6 which are rigidly united, as by welding at their opposite ends, to hinge sleeves 8 (Fig. 5) forming bearings within which the rear legs 2 of the supporting units may turn. The sleeves, with the portions of the legs which they embrace, constitute hinge connections between the back and supporting units. Preferably these hinge connections are of the kind more fully disclosed in the aforesaid patent to Ames, No. 2,282,689, being so devised that when the knurled hand nut 10 (Fig. 5) is loosened, the sleeves may be turned relatively to the legs 2 so as to permit the two supporting units to be swung, so as to lie in substantially parallel planes. When, on the other hand, after having disposed the supporting units in operative relation, the nut 10 is tightened, the hinge connections are locked so as to hold the two supporting units in substantially parallel operative relation and at right angles to the plane of the back.

Figures 17, 18:
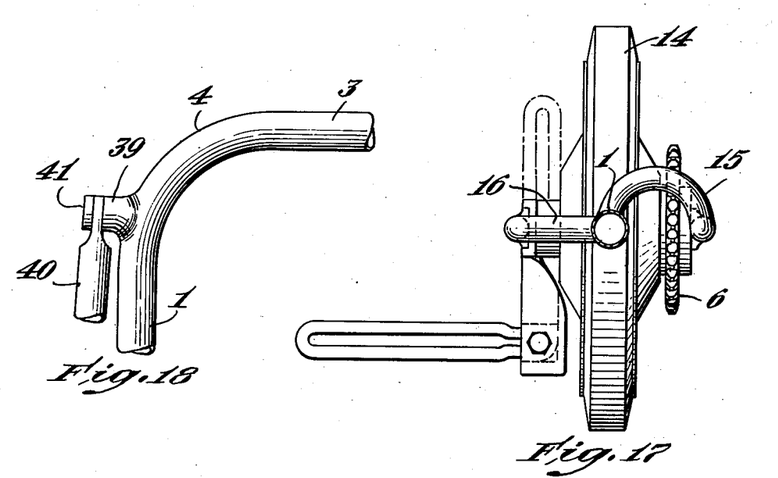
Fig. 17 is a section, to larger scale, substantially on the line 17—17 of Fig. 5.
Fig. 18 is a fragmentary side elevation of the front upper corner of one of the supporting units showing the means for attaching a crossbar thereto.

Each rear leg 2 is provided with a supporting wheel 11 (Fig. 5) preferably having a resilient tire, the wheel bearings being supported in rigid fork arms 12 projecting from a hub 13 which has a swivel connection with the lower end of the respective leg 2. Each front leg 1 is also provided with a supporting wheel 14 preferably similar to the wheel 11, the bearings of each front wheel being mounted in the lower ends of fork arms 15 and 16 (Figs. 5, 6 and 17) which are fixed, for example, by welding to the lower end of the corresponding leg.

Figure 20:
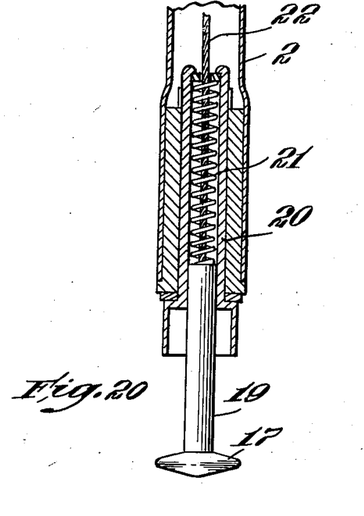
Fig. 20 is a fragmentary vertical section through the lower part of the rear leg of one of the units, showing the brake.

Preferably, as disclosed in the aforesaid application of Ames, Serial No. 520,745, filed February 2, 1944, which became Patent No. 2,437,778 on March 16, 1948, brake means is provided for each of the four wheels. Thus, there is provided a brake shoe 17 for engagement with the tire of each rear wheel, the brake shoe 17 being carried by a vertically sliding stem 19 guided by a sleeve 20 within the lower end of the post 2 and constantly urged downwardly into operative engagement with the wheel tire by a spring 21. Each front wheel is provided with a similar brake shoe 18 correspondingly urged downwardly by a spring. As indicated in Fig. 20, the stem of each brake shoe is connected to a flexible cable 22. Each cable 22 of each respective unit passes up through the tubular leg and through the tubular hand-supporting rail 3 of the corresponding unit, and is connected to appropriate actuating means (not shown) housed within a tubular, rotary handle 23 (Fig. 5) mounted on the rail 3 whereby, upon rotation of the handle 23, the brake shoes 17 and 18 may be elevated out of contact with their respective wheels, all as more particularly described and illustrated in the copending Ames application above referred to. The handle 23 is furnished with a latch 24 for holding the handle in this brake-retracting position. However, upon release of the latch 24, the springs 21 immediately project the stems of the brake shoes downwardly and thus engage the brake shoes with their respective wheels. Since the brakes at opposite sides of the support are independently controlled, it is possible to apply either set of brakes independently of the other, if desired.

The seat 25 consists of a length or panel of flexible material, for example heavy textile fabric, and is attached at its upper end to the upper bar 6 of the back member. The seat includes a rigid bar 26 connected to the fabric at the forward end of the latter, the opposite ends of this bar 26 being designed for detachable engagement with hook-like brackets secured to the forward portions of the stretcher bars 3ª of the respective supporting units. When the seat is arranged in the full line position of Fig. 5, it forms a smooth, concave curve between its upper rear end and its lower forward end, so that the back and bottom portions of the seat merge smoothly with each other. However, if desired, the seat may be arranged as shown in dotted lines in Fig. 5, that is to say, so that it extends from the bar 6 vertically downwardly to the rear of and beneath the lower bar 7 of the back, and thence forwardly to the brackets 27, thus providing a seat having a substantially vertical back 28 and a substantially flat, taut bottom portion 29 extending from the bar 7 to the brackets.

Figures 11, 12:
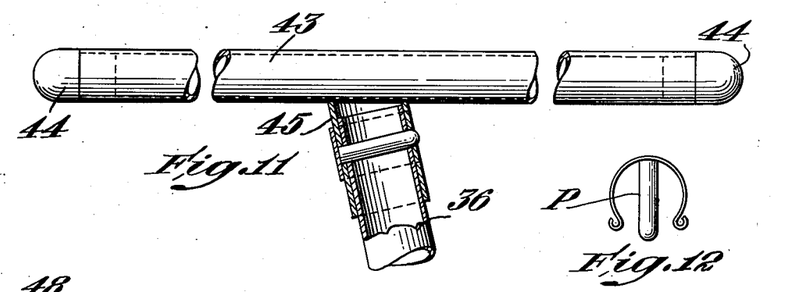
Fig. 11 is an elevation, partly broken away and partly in section, showing one of the stretcher bars of the canopy mounted upon the supporting staff.
Fig. 12 is a plan view of a connector device for detachably uniting the stretcher bar of the canopy to the supporting staff.
Figure 13:
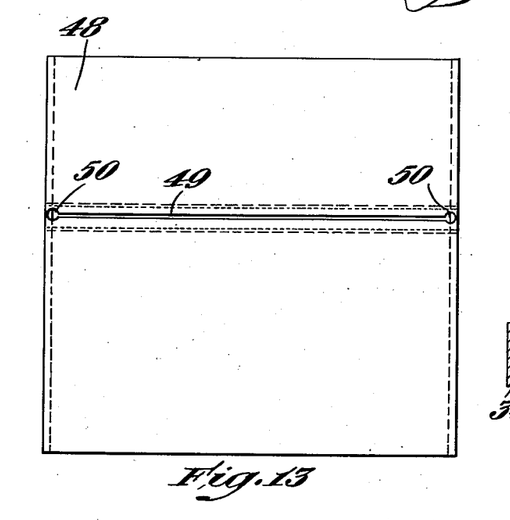
Fig. 13 is a bottom view of the canopy panel removed from its supporting bars.
Figure 16:
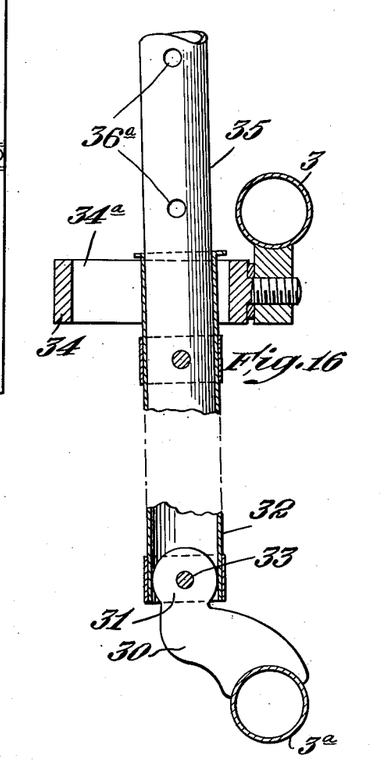
Fig. 16 is a transverse section through the stretcher bar and hand rail of one of the supporting units, showing the upper and lower brackets which support the socket for the crutch and canopy staff, the latter being shown in elevation.

Each of the stretcher bars 3ª is provided, approximately midway of its length (Figs. 5 and 16) with a rigid, outwardly directed bracket 30 having a vertical portion 31 designed to form a support for a tubular, elongate socket member 32. The lower end of this socket member and the vertical portion 31 of the bracket 30 are provided with aligned apertures 33 (Fig. 16) for the reception of a removable, spring-retained attaching pin P (Fig. 12) such as disclosed more fully in the aforesaid copending application of Ames. The tubular sockets 32 are of a length (Fig. 16) such as to reach up substantially to the level of the hand-supporting rails 3, the latter being furnished with outwardly directed rigid brackets 34 having horizontal, elongate slots 34ª for the reception of the upper parts of the tubular sockets 32, the elongate slots in the bracket 34 permitting the sockets to swing about their pivot connections P to the lower brackets 30. Each of the sockets 32 is designed to receive the lower, substantially straight portion 35 (Figs. 6 and 16) of a staff—preferably a length of stiff, rigid but thin metal tubing whose upper portion 36 is bent to form an arc of substantial radius, for example of the order of 60°. Each of these staffs is furnished with a series of transverse openings 36ª (Fig. 16) designed to receive a removable pin, such as the pin P (Fig. 12) passing through the staff and through an opening in the upper end of the socket 32, the series of openings 36ª permitting vertical adjustment of the staff in the socket. The openings 36ª are so arranged, with reference to the plane of curvature of the upper portion of the staff, that by rotating the staff about its own axis through 180°, it may be fixed in position so that the convex sides of the two staffs are substantially opposed, or, alternatively, so that the concave sides of the staffs are toward each other, the staffs being held in either of these positions by engagement of the removable pin P in one of the openings 36ª and in the corresponding opening in the socket.

Figure 2:
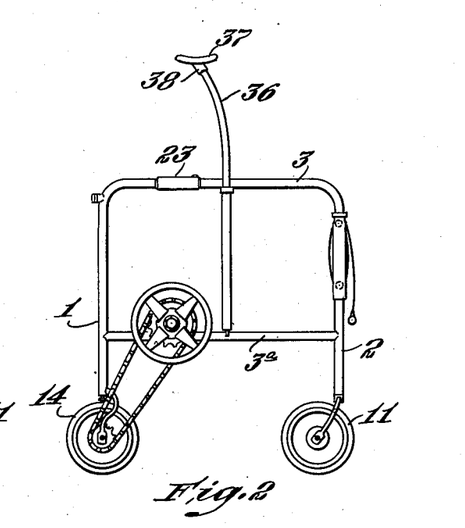
Fig. 2 is a similar diagrammatic side elevation showing the device supplied with crutches to assist a person who must necessarily employ crutches in walking.

When the staffs are disposed, as above suggested, so that they are concave toward each other, they constitute appropriate supports for crutch arm rests or pads 37 (Fig. 2), these arm rests having sockets 38 designed to fit over the upper ends of the respective staffs and to be removably attached to the staffs by pins P passing through aligned openings in the sockets and in the upper ends of the respective staffs. This arrangement of the apparatus is diagrammatically illustrated in Fig. 2, it being noted that when the crutch members 37 are in place, the curvature of the staffs is such as to bring the rests 37 substantially above the brake-actuating handles 23, so that the user of the device, having the crutch pads 37 beneath his arm pits, finds the handles 23 conveniently located to be grasped by his hands. As pointed out in the aforesaid copending Ames application, this arrangement permits the user to propel himself rapidly along, even though he may be able to contact the ground with but one foot, and also to have complete control over the apparatus by the use of the independently operated brake device. Since the sockets 32 are permitted to move toward and from each other, the crutch pads 37 accommodate themselves to users of varying size, the vertical adjustment of the staffs in the sockets also contributing to this utility.

Figure 1:
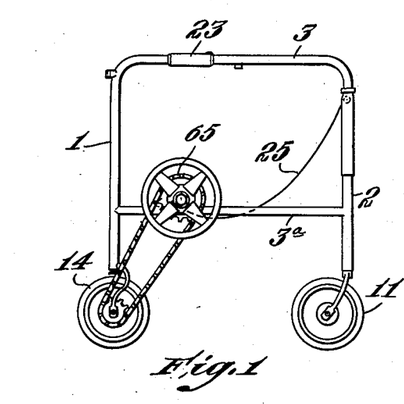
Fig. 1 is a diagrammatic side elevation showing the device in its simplest form as arranged to assist a person in walking, or as a portable seat, if desired.

If the occupant does not wish to use crutches, the staffs may be withdrawn from the sockets, and, if desired, the sockets may also be removed from the apparatus so that the apparatus when in use appears as illustrated in Fig. 1. The occupant then stands between the two parallel supporting units, and, holding on to the hand-supporting rails 3, walks while supporting a portion of his weight by his arms. In such use of the device, the seat 25 may, if desired, be disconnected at its forward end and coiled about the bars 6 and 7, or, if the occupant wishes to seat himself, the seat may be arranged as shown in Fig. 1.

Figure 19:
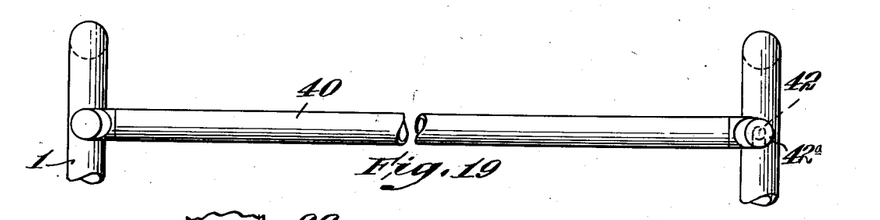
Fig. 19 is a fragmentary front elevation showing the brace bar in operative position.

When using the crutches, it may be desirable to impart additional stiffness to the support, since the user's weight acts with very considerable leverage. With this in view, each supporting unit is provided with a bracket 39 (Figs. 5 and 18) welded or otherwise rigidly secured to its front leg 1, adjacent to the junction of the front leg 1 with the hand-supporting rail 3. Pivotally secured to one of these brackets 39 is a brace bar 40 secured to the bracket 39 by a pivot pin 41 whose axis preferably slopes downwardly and rearwardly at a slight angle from the horizontal. The bracket 39 of the other unit is provided with a rigid headed pin 42 (Fig. 19) which is designed to receive a hook portion 42ª at the free end of the pivoted brace bar 40. Since the pivot pin 41 is not exactly horizontal, the swinging of the bar 40 about this pivot causes its free end normally to lie forwardly of the head of the pin 42, and in order to engage the hook 42ª with the pin 42, it is necessary to spring the bar 40 rearwardly. Thus, when the hook 42ª is engaged with the pin 42, it is retained thereon by substantial frictional pressure so that it can not accidentally be detached, and presses so firmly against the pin as to constitute a very rigid connection between the forward ends of the supporting units. The lower end of the post 1 to which the brace is pivotally connected is furnished with a pin 42ᵇ similar to the pin 42 with which the hook 42ª may be engaged when the brace bar is not in use, thereby to prevent the brace bar from swinging and to hold it substantially in alignment with the leg 1.

Assuming that the user does not wish to employ crutches, but does desire protection from the sun or rain, the present apparatus provides a suitable canopy which may be mounted upon the same staffs 35 which are otherwise used for supporting the crutch pads.

Figure 3:
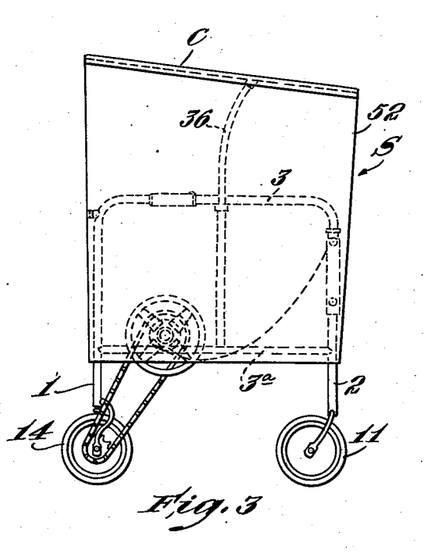
Fig. 3 is a view generally similar to Fig. 1 but showing the device provided with a canopy and a weather shield.
Figure 8:
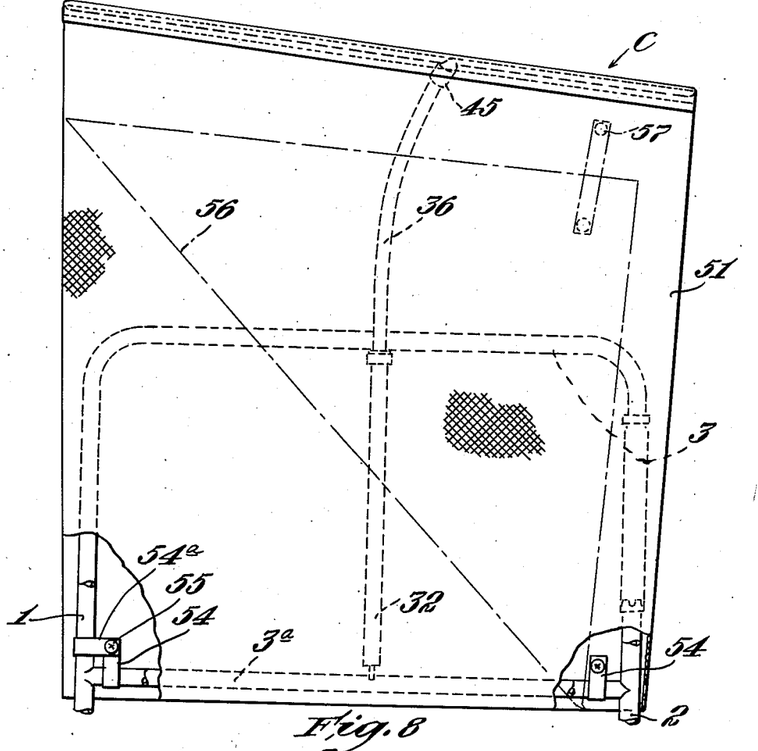
Fig. 8 is a fragmentary side elevation showing the upper part of the device with the weather shield applied thereto, the shield being shown in broken lines as partially raised.

The canopy C (Figs. 3, 6, 8, 9, 10, 11 and 13) preferably comprises two normally substantially parallel rigid elongate stretcher bars 43, for example lengths of stiff thin-walled metal tubing, preferably finished at their opposite ends by solid plugs 44. Each of the bars 43 is furnished, at a point which may be substantially midway between its ends, although preferably somewhat nearer its rear end than its front end, with a socket 45 (Fig. 11) which is designed to fit over the upper end of one of the staffs 36 and to be detachably secured thereto by one of the removable pins P (Fig. 12) above referred to. The axis of the socket 45 is disposed at an angle (other than a right angle) with respect to the length of the bar 43 so that when the bars are mounted on the upper ends of the staffs, as illustrated in Figs. 3 and 8, for example, the bars 43 slope downwardly from front to rear to facilitate the shedding of rain by the canopy.

Figure 6:
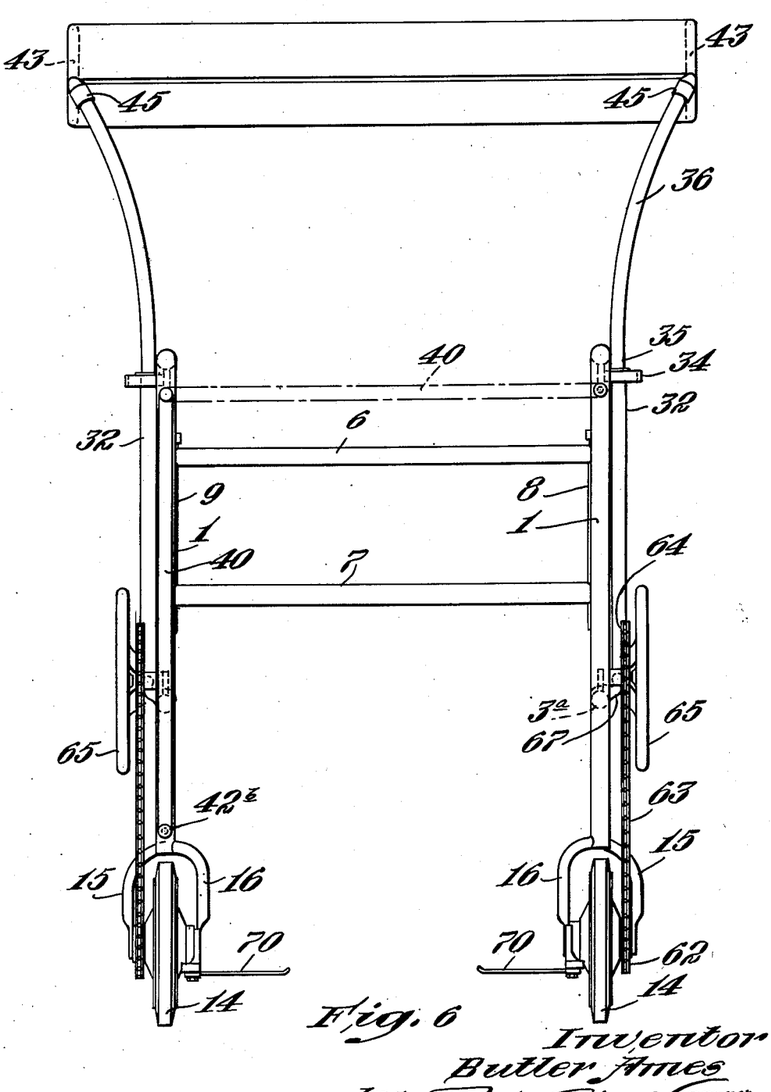
Fig. 6 is a front elevation of the device of Fig. 5 showing the canopy in place.

The canopy comprises a top panel made of some thin, flexible, light-weight material, for example airplane fabric or the like, water-proof or water-resistant, and arranged to form upper and lower plies 47 and 48 (Figs. 9 and 13) which are secured together at their forward and rear edges, for instance integrally, and also along their lateral edges, for instance by sewed seams. The bottom ply is preferably furnished with a transverse slot 49 (Fig. 13) terminating at its opposite ends in openings 50 of diameters such as to receive the sockets 45 of the stretcher bars 43. The union of the upper and lower plies along the longitudinal edges of the canopy panel provides pockets for the reception of the respective stretcher bars 43, the canopy panel being of a length substantially equalling that of the stretcher bars and being of such width that when the stretcher bars are inserted in the longitudinal edge portions of the canopy and their sockets 45 are mounted on the staffs 35 (properly arranged as shown in Fig. 6), the canopy is held transversely taut and substantially flat. However, by disconnecting the sockets 45 from the staffs 35, the stretcher bars may readily be removed from within the canopy panel through the slot 49, or, if preferred, they may be disposed side by side within the canopy, and the two-ply canopy wrapped about them to form a compact bundle.

When the canopy is in place, the seated occupant is shielded from rain and sun—the application of the canopy being a matter which requires but little skill or effort and such as may be accomplished by a person even though incapacitated to stand.

Figure 14:
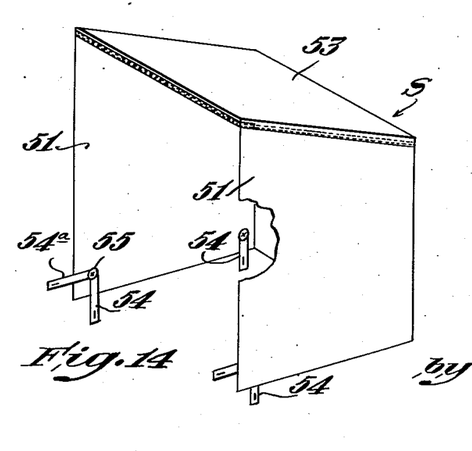
Fig. 14 is a perspective view of the weather shield removed from its supporting means.

To give further protection to the occupant, the present invention provides a weather shield S (Figs. 3, 8 and 14), such shield being of suitable material, for example thin water-proof and wind-proof textile fabric or the like, and comprising the opposite side walls 51, the rear wall 52, and preferably a top wall 53. The dimensions of the top wall 53 are such that the weather shield S may be fitted over the canopy C, with the top wall 53 of the weather shield resting upon the upper surface of the canopy and with the side walls 51 of the weather shield depending from the lateral edges of the canopy, the length of the walls of this weather shield being such that their lower edges lie approximately in the horizontal plane of the stretcher bars 3ª of the supporting unit. The lower portions of the walls of the weather shield are furnished with tabs 54 and 54ª having buttonholes in their free end portions, and buttons 55 are arranged adjacent to these tabs at the inside of the wall. When in use, the tabs 54 are passed about the stretcher bar 3ª (Fig. 8) and their free ends are buttoned onto the buttons 55. The tab 54ª is likewise passed about the front leg 1 of the supporting unit and also buttoned over the adjacent button 55. The weather shield is thus held securely to the frame of the apparatus so that it can not be blown off or disarranged. When the front corners of this weather shield are thus buttoned to the front legs 1 of the units, it is only the front side of the apparatus which is open. If, however, the occupant wishes more ventilation and a wider view, he may unbutton the front lower corners of the side walls of this weather shield and fold these corners upwardly along the diagonal line 56 (Fig. 8) and connect one of the tabs 54 or 54ª to a button 57 arranged at the inside of the side wall of the weather shield near the top rear corner of said wall, as indicated in broken lines in Fig. 8.

Figure 4:
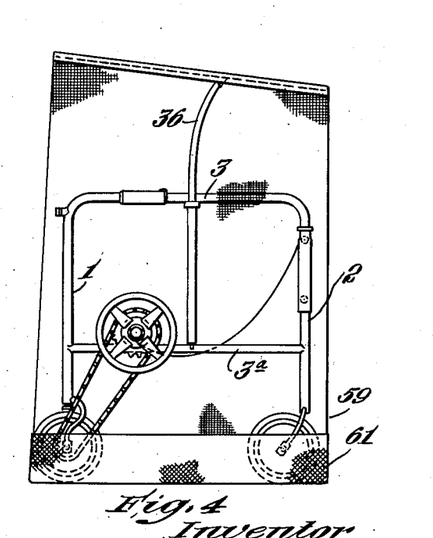
Fig. 4 is a view similar to Fig. 3 but showing the device provided with an insect guard.
Figures 9, 10, 15:
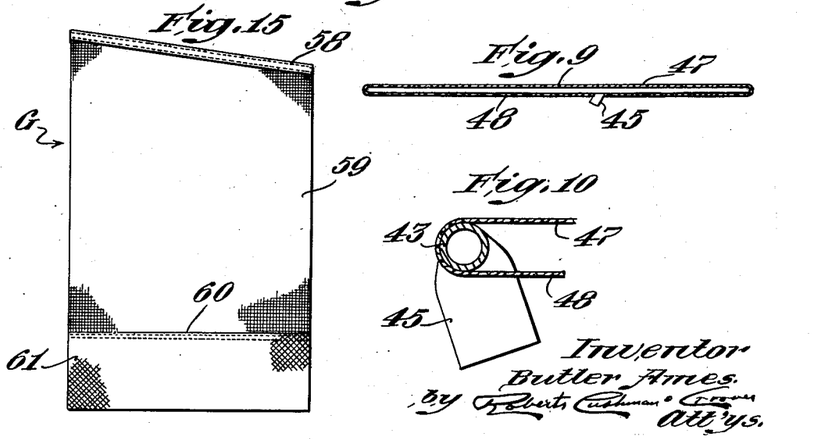
Fig. 9 is a longitudinal vertical section, to small scale, through the top panel of the canopy.
Fig. 10 is a fragmentary transverse section, to larger scale, through the canopy panel, one of the stretcher bars being shown in section.
Fig. 15 is a diagrammatic side elevation of the insect guard removed from the canopy.

To afford protection from insects, the invention also contemplates the provision of an insect guard G (Figs. 4 and 15). This insect guard follows in general the construction of the weather shield just described, having a top wall 58 designed to rest upon the canopy top, side walls 59, a rear wall, and in this case a front wall, the vertical walls, at least, of this insect guard being, in the main, of foraminous material, for example woven textile mosquito netting, such as to prevent the entrance of insects. Preferably the foraminous material terminates at a point above the ground level, and has connected to its lower edge by a seam 60 a ground cloth 61 of some stronger more wear-resistant material, such as heavy textile fabric. This ground cloth 61 is wide enough, vertically, so that when the insect guard is in place and supported by the canopy, the lower margin of this ground cloth lies on the ground and may, if desired, be tucked beneath the wheels of the support so as to be held firmly in place. The margins of the ground cloth would, of course, have to be tucked beneath the wheels of the support by an attendant since the occupant seated within the support would not be able to lift the wheels from the ground to draw the margins of the ground cloth beneath the wheels or to roll them over the margins even if he was not partially incapacitated. The attendant would also ordinarily have to remove the ground cloth from beneath the wheels and lift the insect guard G from the support, although it is quite possible that the occupant by throwing his weight to one side of the support might relieve the pressure on the opposite side sufficiently so that he could tug the ground cloth loose, and vice versa, whereupon he could lift the lower part of the insect guard upwardly and drape it over the corners of the support from the canopy whereupon he could then propel the support wherever he wished to go. It is obvious that this insect guard may be used as an addition to the weather shield under certain conditions, or that it may be used without the weather shield when desired. It is also apparent that if for any reason it be desired to dispense with the top panel of the canopy, this may be removed from the stretcher bars and either the weather shield, the insect guard or both supported directly by the stretcher bars 43.

Since the occupant of this support may be so incapacitated that he can not use his feet for propelling himself, the present invention provides manually actuated propelling means. Thus, each forward supporting wheel 14 is provided with a sprocket wheel 62 (Figs. 5, 6 and 17) coaxial with the respective wheel 14 and rigidly secured to the latter, preferably at the outside of the wheel. An endless sprocket chain 63 engages the sprocket wheel 62 and passes around another sprocket wheel 64 (Figs. 5 and 6) fixed to and in coaxial relation with a hand-operated wheel 65 mounted on a stub shaft 66 (Fig. 5) fixed in a bracket 67 carried by the stretcher bar 3ª of the respective supporting unit. The sprocket wheels 62 and 64 lie in substantially the same vertical plane and turn about parallel axes, the hand-wheel 65 being of substantially larger diameter than the sprocket wheel 64 and preferably having a smooth rounded rim to be grasped by the hand of the user.

As illustrated (Figs. 5 and 17), the outside fork 15 which supports the wheel 14 is bent rearwardly and downwardly in a reverse curve so as to provide clearance for the upper run 63$^a$ of the sprocket chain. With this arrangement it is unnecessary to uncouple the chain in passing it about the sprocket wheel 62, since the run 63$^a$ of the chain lies wholly outside of the bracket arm 15. The application and removal of the sprocket chain is thus greatly facilitated.

Figure 7:
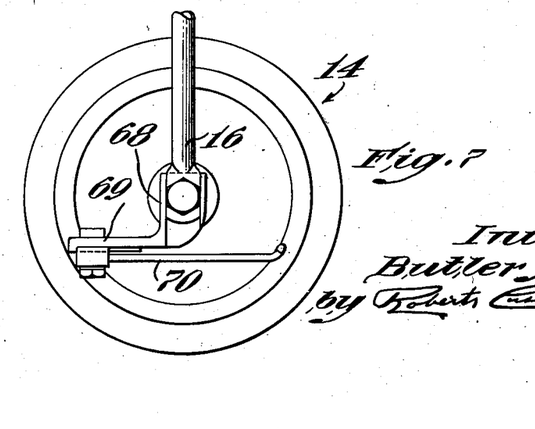
Fig. 7 is a side elevation, showing one of the front wheels and a foot rest associated therewith, the foot rest being disposed in folded or inoperative position.

When the support is to be propelled by the use of the hand-wheel 65, it is desirable to support the occupant's feet above the ground, and for this purpose each leg 1 is provided at its lower end with a bracket 68 (Fig. 7) having a horizontal, forwardly directed portion 69 carrying a vertical pivot to which is secured one end of a horizontal foot rest 70. When this foot rest is not in use, it lies substantially parallel to the plane of the wheel 14 as shown in Fig. 7, but when the occupant of the support wishes to use it, the foot rest is swung to the position shown in Figs. 6 and 17 where it forms a convenient rest for his foot.

When the canopy, weather shield and insect guard are not in use they may, if desired, be folded compactly into a bundle and the seat 25 may be disengaged at its forward end, brought down and rearwardly beneath the lower bar 7 of the back, and then forwardly to form a pocket for the reception of the bundled materials—the bar 26 of the seat being passed up over the top bar 6 of the back so as to hold the bundled material in place.

The device as thus constructed, like that disclosed in the Ames patent above referred to, is very light in weight although stiff and rigid and of small dimensions, being in fact but little wider than the body of the occupant. Thus, by way of example, its maximum outside width may be of the order of 25 inches; its maximum front-to-rear length of the order of 28 inches; and the height of the lower bar 7 of the back approximating 17 inches from the floor, so that the support may readily be wheeled into the stall of a public toilet. When the canopy or crutch-supporting staffs are removed, its height is not excessive, being approximately the height of the hips of the occupant, and the thus the device may be moved about very readily, propelled along sidewalks and in crowded localities without difficulty and without undue interference with the movements of other persons, and, on the other hand, when not in use, it may be folded into a very compact package which may be carried in one hand and whose maximum thickness from side to side does not exceed 8 or 9 inches.

While certain desirable features and embodiments of the invention have been herein illustrated and described, it is to be understood that the invention is not necessarily limited to the precise details herein disclosed, but is to be regarded as broadly inclusive of any and all modifications thereof falling within the scope of the appended claims.

I claim:

1. A wheeled vehicle of the class described which includes spaced side frames, characterized in that each side frame has a socket for the reception of an upright staff, each socket being a vertically elongate rigid tubular member, means removably uniting each socket to the corresponding side frame, a staff held by the socket of each side frame, each staff comprising a substantially straight lower portion which is seated within the corresponding socket, the upper portion of each staff being curved, means operative to hold each staff, when seated in its socket, at either of two selected positions substantially 180° apart, said holding means being so designed that the plane of curvature of each staff in each respective position extends transversely of the vehicle, a collapsible canopy of a transverse width greater than that of the vehicle, and means securing the canopy to the upper ends of the respective staffs when the latter are disposed with their convex curvatures toward each other.

2. A foldable support comprising a pair of supporting units hinged to a back, each unit including a hand-supporting rail and a rigid stretcher bar below the hand-supporting rail and spaced from and substantially parallel to the latter, each unit having front and rear wheels characterized in that a vertically elongate rigid tubular socket is carried by each unit, the stretcher bar of each unit having a rigid outwardly directed bracket constituting a support for the lower end of the respective socket, means removably securing each socket to the corresponding bracket, confining means carried by the hand-supporting rail of each unit for positioning the upper end of the corresponding socket, staffs having lower portions telescoped into the respective sockets, each staff being vertically adjustable in its respective socket so that the heights of the staffs may be varied at will, means so connecting each staff to its respective socket that each staff may be turned and held in either of two positions selected substantially 180° apart, the staffs being so shaped that when in one of said positions their upper ends are relatively close together and when in their other positions their upper ends are relatively far apart, a collapsible canopy frame of a width greater than the distance between the units, said canopy frame including rigid elongate side members, means removably connecting the side members of the canopy frame to the upper ends of the respective staffs when said ends are in the last-named position, the upper ends of the staffs, when in their relatively close position, being so spaced as to constitute acceptable supports for crutch pads.

3. A foldable support comprising a pair of supporting units hinged to a back, each unit having front and rear wheels and each unit including a hand-supporting rail and a rigid stretcher bar below the hand-supporting rail and spaced from and substantially parallel to the latter, characterized in having a rigid bracket secured to each stretcher bar, a tubular vertically elongate socket member removably secured at its lower end to each of the respective brackets, each socket member extending up substantially to the level of the corresponding hand-supporting rail, each hand-supporting rail comprising a bracket having transversely elongate guide means for the socket member, said guide means being so constructed and arranged as to permit the upper portion of the socket to swing toward and away from the hand-supporting rail about its connection to the corresponding bracket, a staff having its lower end portion telescoping within each corresponding socket, means for adjusting the height of each staff relatively to its socket, a collapsible canopy frame, and means for removably attaching the canopy frame to the upper ends of the staffs.

4. A foldable support of the kind which includes a pair of supporting units disposed in substantially parallel planes, and means connecting the units, each unit having front and rear wheels and including a hand-supporting rail and a rigid bar below the hand-supporting rail and spaced from and substantially parallel to the latter, two vertically elongate sockets and means removably attaching the sockets to the parallel rails of the respective units, characterized in having a pair of upright staffs each having its lower portion telescoped within one of the sockets respectively, the upper parts of the staffs being curved longitudinally and the lower portion of each staff being substantially straight and rotatable within its socket, means operative to fix each staff in its respective socket in either of two positions approximately 180° apart, so that the upper portions of the staffs may be arranged to be convex or concave toward each other respectively, the upper ends of the staffs being spaced further apart when they are convex toward each other than when they are concave toward each other, a collapsible canopy frame of a width substantially equal to the distance between the upper ends of the staffs when the staffs are convex toward each other, means operative removably to secure the canopy frame to the staffs, the upper ends of the staffs being so spaced, when the staffs are concave toward each other, as to constitute acceptable supports for crutch pads.

5. A wheeled vehicle of the class described which includes spaced side frames, an upright staff removably attached to each side frame and a collapsible canopy supported by the staffs, characterized in that the collapsible canopy comprises a textile panel and substantially parallel, removable stretcher bars, each provided with means detachably securing it to the outer end of one of the staffs respectively, and a weather-protecting shield of thin, water-repellant, flexible fabric comprising a top which rests upon the canopy panel thereby providing a roof which is a plurality of plies thick, the shield having vertical side and rear walls which are united along adjacent vertical edges, means detachably connecting the lower edges of the vertical walls to the side frames of the vehicle, and means detachably holding the front lower corners of said vertical side walls in partially raised position after they have been first detached from the side frames of the vehicle and folded upwardly along a diagonal line extending from the top front corner to the lower rear corner of the wall.

6. A wheeled vehicle of the class described which includes spaced side frames, an upright staff secured to each side frame and a collapsible canopy supported by said staffs, characterized in that the canopy comprises substantially parallel stretcher bars each provided with means detachably mounting it on the upper end of one of said staffs respectively, a panel of flexible textile fabric mounted on the stretcher bars, an insect guard having a top wall which rests upon the canopy panel, said insect guard having vertical front, rear and side walls of foraminous material united at their adjacent vertical edges and extending from the canopy panel to the ground and ground cloths attached to the lower edge of the side walls for engagement with the ground beneath the wheels to hold the walls of the insect guard taut.

7. A wheeled vehicle of the class described having spaced side frames, characterized in having protecting means for the vehicle occupant including a collapsible canopy panel of a width greater than the distance between the side frames of the vehicle and comprising superposed plies of flexible water-resistant fabric, means uniting said plies along their lateral edges to form pockets for the reception of stretcher bars, the lower panel ply having a transverse slot terminating at its ends in openings of a diameter appropriate to receive supporting staffs, a rigid stretcher bar loosely disposed in each of the pockets of the panel and which is removable from the panel through said elongate slot, each stretcher bar having a socket intermediate its ends which projects down through the corresponding opening at the end of the slot in the lower panel ply, and an upright staff carried by each side frame respectively of the vehicle, the upper ends of said staffs fitting within the respective sockets of the stretcher bars and being so laterally spaced that when seated in the sockets the canopy panel is held transversely taut.

8. A wheeled vehicle of the class described having spaced side frames, characterized in having protecting means for the occupant including a canopy panel of a width greater than the distance between the side frames of the vehicle, stiffening members for the opposite lateral edges of the canopy panel, an upright staff carried by each side frame of the vehicle, means removably connecting the canopy panel to the upper ends of the respective staffs, said upper ends being so spaced that the panel is held transversely taut, and a weather shield having a top wall of substantially the same size and shape as the canopy panel and which rests upon the latter, the weather shield having vertical walls which extend downwardly from the canopy at the outsides of the side frames of the vehicle, and fastening means including tabs and buttons engageable for holding said vertical walls in partially raised position.

BUTLER AMES.

REFERENCES CITED

The following references are of record in the file of this patent:

UNITED STATES PATENTS

| Number | Name | Date |
|---|---|---|
| 88,954 | Fuchs | April 13, 1869 |
| 139,450 | Bockstaller | June 3, 1873 |
| 194,516 | Fitzgerald | Aug. 28, 1877 |
| 334,584 | Haynes | Jan. 19, 1886 |
| 433,508 | Akers | Aug. 5, 1890 |
| 487,544 | Simon | Dec. 6, 1892 |
| 593,584 | Jewett | Nov. 16, 1897 |
| 604,212 | Palmer | May 17, 1898 |
| 677,346 | Estes | July 2, 1901 |
| 906,845 | Adair | Dec. 15, 1908 |
| 916,439 | Grover | Mar. 30, 1909 |
| 1,393,461 | Steele | Oct. 11, 1921 |
| 1,415,332 | Gebhard | May 9, 1922 |
| 1,947,410 | Emerson | Feb. 13, 1934 |
| 1,982,165 | Hounsfield | Nov. 27, 1934 |
| 2,129,260 | Bowser | Sept. 6, 1938 |
| 2,258,488 | Gaverth | Oct. 7, 1941 |
| 2,282,689 | Ames | May 12, 1942 |

FOREIGN PATENTS

| Number | Country | Date |
|---|---|---|
| 248,434 | Germany | June 22, 1912 |
| 218,181 | Great Britain | July 3, 1924 |